Patented Sept. 25, 1928.

1,685,511

UNITED STATES PATENT OFFICE.

WILLIAM E. THOMAS, OF OAKLAND, CALIFORNIA.

PROCESS FOR PREPARING SPINACH AND THE LIKE FOR CANNING.

No Drawing.   Application filed September 27, 1927.   Serial No. 222,399.

The invention relates to a process for preparing vegetables for canning, and particularly to a blanching or wilting step thereof as applied to chlorophyll containing vegetables such as spinach.

An object of the invention is to provide a process of the character described whereby a maximum retention of the natural color of the vegetable may be assured in the final product.

Another object of the invention is to provide for the blanching or wilting of the vegetable in such a manner as to produce a minimum effect on other qualities of the vegetable than the color and turgidity thereof.

The invention possesses other objects and features of advantage, some of which, with the foregoing, will be set forth in the following description of the preferred form of the invention. It is to be understood, however, that variations in the showing made by the said description may be adopted within the scope of the invention as set forth in the claims.

In the preparation of vegetables for canning, it has long been the practice to subject certain vegetables to the action of boiling water or steam until a desired degree of blanching or wilting has been effected. Though the wilting of the vegetable to reduce the bulk and air content thereof is a major purpose of the treatment, certain other effects are produced by this step which have an important bearing on the qualities of the final product. One of the effects of the step is a partial scalding or cooking of the vegetables at least at their surfaces whereby their structures are broken down and more or less of the soluble constituents thereof are freed for solution, so that during this process a leafy vegetable such as spinach may lose as much as thirty percent of its total dry matter and so be deprived of a considerable and important part of its nutrient value. The method of blanching vegetables at temperatures about that of boiling water also makes possible an undesirable abrasion and breaking up of the vegetable during the subsequent process of filling it into cans. With respect to the question of color, blanching at temperatures about that of boiling water, even when followed by an application of cold water, has been shown by experiment to have no measurable effect in preserving a natural color for the canned vegetable product, so that the product is generally of an unattractive and unnatural color. It will thus be clear that the present method of blanching at temperatures about that of boiling water is accompanied by unnecessary and even harmful effects to the vegetable, which effects have tended, particularly in the case of the green and leafy vegetables, to limit the consumer demand therefor.

It will now be noted that as the chlorophyll of green vegetables is heated to a sufficiently high temperature it changes from its normal colloidal form into a solution in the wax of the chlorophyll carrying cells, and that when it is so dissolved the organic acids of the vegetable may react with it to produce the brownish compound phæophytin and the before mentioned change of color occurs. During the heating and as a preliminary to such solution of the chlorophyll, the chloroplasts undergo certain changes in their structures, which changes are of a permanent nature, so that even though a heating be discontinued before the before-mentioned solution of the chlorophyll takes place, permanent changes in the physical and chemical qualities of the chlorophyll are effected. It will thus be clear that if a wilting of the vegetable could be effected at such a temperature or under such other conditions as would prevent a solution of the chlorophyll in the wax of the leaf cells, the action of the acids of the vegetable on the chlorophyll during the wilting process may be minimized, and it is to the application of this principle that the present invention particularly relates.

As applied generally to the preparation of a vegetable for canning, the steps in my process comprise a preliminary washing of the vegetable in cold water, and thereafter subjecting it for a time to a temperature below that at which the chlorophyll thereof would be rendered appreciably available to the acids of the vegetable, such application of heat being preferably effected by means of hot water. As applied specifically to the canning of spinach, it has been found that the maximum allowable temperature for the purpose is approximately 160 degrees Fahrenheit, it being obvious that the desirable temperature of the water will vary somewhat as between different vegetables or even for the same vegetable when grown under different conditions. It will, of course, be obvious that with the temperature so far below boiling, the time required for effecting the wilting will be correspondingly longer than that required in the present practice of wilting at temperatures close to the boiling temperature of water. On the other hand, the temperature penetration in the longer time will be more thorough and even, so that a more uniformly treated product results, and the fact that no appreciable cooking of the vegetable occurs eliminates the question of the loss of the valuable soluble constituents.

When a vegetable prepared for canning in the manner of my invention is subsequently canned by a process including its heating to adequately sterilize the canned product, the product is found to have a color very close to the natural color of the vegetable, thus clearly indicating that the wilting performed in the manner of my invention has fixed or set the chlorophyll against the usual color changing effect of the subsequent and necessarily high sterilizing and cooking temperatures. From a consideration of the foregoing discussion relating to the effect of heat on the chlorophyll, it appears that the changes effected in the chloroplasts by the uniform and relatively slow heating thereof at the temperature specified are such as to render the chlorophyll thereafter less susceptible to the influence of heat for transforming it into phæophytin. That such is indeed the case, is further indicated by the fact that, after a period of not less than about four minutes of the treatment at the fixing temperature, the temperature may then be appreciably raised without effecting a change in color of the vegetable, it being noted that such increase in temperature may be utilized to complete the wilt at a faster rate and so hasten the process.

It is to be particularly noted that the process now described for improving the quality and color of canned vegetables has been in use for some time and that the results thereof have been both positive and universally dependable. And it will be further noted that while the application of the process is herein more specifically set forth is that which has been used in the canning of spinach, the same may be effectively applied to the preparation of other chlorophyll containing vegetables for canning.

I claim:

1. A process for preparing vegetables for canning, which comprises wilting the vegetable at the maximum temperature at which the formation of phæophytin from the chlorophyll thereof would be insufficient to appreciably affect the natural color of the vegetable.

2. A process for preparing vegetables for canning which comprises wilting the vegetable in a water bath which is maintained during a predetermined period of time at substantially the lowest temperature at which the production of phæophytin from the chlorophyll thereof would occur in the vegetable as the result of a heating thereof.

3. A process for preparing vegetables of a relatively high turgidity for canning, which comprises wilting the vegetable at a uniform temperature and for a definite minimum time in a water bath not exceeding substantially the lowest temperature at which the chlorophyll of the cells becomes soluble in the wax of the cells.

4. In a process for preparing vegetables for canning, the steps of wilting the vegetable for a predetermined minimum time in a water bath having a temperature not exceeding the lowest temperature at which the chlorophyll of the cells becomes soluble in the wax of the cells and thereafter increasing the temperature of the water bath for hastening the completion of the wilt.

5. In a process for preparing spinach for canning, the step of wilting the spinach at a uniform temperature approximating 160 degrees Fahrenheit.

6. A process for preparing spinach for canning which comprises wilting the spinach for approximately four minutes in a water bath at a uniform temperature of substantially 160 degrees Fahrenheit, and thereafter increasing the temperature for completing the wilt.

In testimony whereof, I have hereunto set my hand at Oakland, California, this 20th day of September, 1927.

WILLIAM E. THOMAS.